OR 3,819,252

United States

Giglia

[11] 3,819,252

[45] June 25, 1974

[54] ADDITIVES THAT INCREASE THE STABILITY OF ELECTROCHROMIC FILMS IN ELECTROCHROMIC DEVICES

[75] Inventor: Robert Domenico Giglia, Rye, N.Y.

[73] Assignee: American Cyanamid Company, Stamford, Conn.

[22] Filed: Dec. 21, 1972

[21] Appl. No.: 317,458

[52] U.S. Cl. .............................. 350/160 R
[51] Int. Cl. .................................. G02f 1/40
[58] Field of Search ..................... 350/160 R

[56] References Cited
UNITED STATES PATENTS
3,708,220  1/1973  Meyers .......................... 350/160 R

*Primary Examiner*—Ronald L. Wibert
*Assistant Examiner*—Paul K. Godwin
*Attorney, Agent, or Firm*—Charles J. Fickey

[57] ABSTRACT

An electrochromic data display and imaging device which may be formed by sandwich arrangement of the imaging area, the counter-electrode area with a suitable electrolyte layer between, having additives incorporated in the electrolyte. The device exhibits superior electrochromic reversibility and improved speed and cell life over prolonged coloration and erase cycles.

8 Claims, 5 Drawing Figures

PATENTED JUN 25 1974                                    3,819,252

ADDITIVES THAT INCREASE THE STABILITY OF ELECTROCHROMIC FILMS IN ELECTROCHROMIC DEVICES

BACKGROUND OF INVENTION

This invention relates to electro-optical devices whose electromagnetic radiation absorption characteristics can be selectively altered by influence of a suitably controlled electric field. More particularly, the invention is concerned with an electro-optical device which has a faster switching speed and extended cycle lifetime. Still more particularly, this invention is directed to a sandwich type cell in which two layers of electrochromic material are separated by solid, semi-solid or liquid ion conducting media. It particularly relates to the addition of compounds to the conducting media.

In commonly assigned, copending U.S. applications, Ser. No. 41,153, Ser. No. 41,154, now U.S. Pat. No. 3,708,220 and Ser. No. 41,155, all filed May 25, 1970, and U.S. Pat. Nos. 3,521,941 and 3,578,843, there are described electro-optical devices exhibiting a phenomenon known as persistent electrochromism wherein electromagnetic radiation absorption characteristic of persistent electrochromic material is altered under the influence of an electric field. Such devices were employed in sandwich arrangement between two electrodes. Coloration was induced by charging the electrochromic film negative with respect to the counter-electrode, employing an external potential. The counter-electrode can be the same as the persistent electrochromic material or different.

By reversing the original polarity of the field or by applying a new field, it was also possible to cancel, erase or bleach the visible coloration.

These steps of color induction and erasure are defined as cycling.

Although the devices described in the prior applications are effective to change their electromagnetic radiation transmitting properties under the influence of an electric field, the practicality of a simple sandwiched or layered arrangement of electrodes and layer of electrochromic material is somewhat limited due to the fact that prior devices did not exhibit high speed switching capability of extended cycle lifetime.

It is therefore an object of this invention to provide an electrochromic imaging device having an improved switching speed.

A further object is to provide an electrochromic device having improved stability and extended cycle lifetime.

These and other objects of the invention will become apparent as the description thereof proceeds.

This sortcoming has been overcome in the present invention by employing additive compounds in the electrolyte.

SUMMARY OF THE INVENTION

The image display device is formed in a sandwich arrangement of an electrochromic layer as an imaging area and a counter-electrode with a spacing of a conducting medium, e.g. an electrolyte, between the areas. Means are provided for supplying electric current to the counter-electrode layer. Any conventional means is suitable. A particularly advantageous means for electrical connection is to deposit the electrochromic imaging layer and counter-electrode on a conductive surface, such as NESA glass. It is particularly advantageous to incorporate an electrodhromic material with the counter-electrode which is identical to that used for the imaging area. This provides greater compatibility between imaging area and counter-electrode, and allows the device to operate on lower voltage.

In the present invention, the electrolyte layer has added to it certain compounds which result in faster switching time, i.e. coloring and bleaching of the image layer, and extended cycle lifetime. This is believed to result from a reduction of dissolution of the image layer in the electrolyte, but applicants do not wish to be bound by this explanation.

The longer cell life thus achieved, in contrast to the embodiments of the earlier applications, permist commercial applications wherein stringent cell stability and life requirements are imposed. Thus, the invention is applicable to variable reflective mirrors and data display devices for use in protracted service. The field of practical use is widened, moreover, by use of a semi-solid conducting media permitting ease of assembly and minimizing the possibility of premature failure from leakage or evaporation.

The foregoing and other features, objects and advantages of the present invention will become more apparent from the following detailed description.

DETAILED DESCRIPTION OF INVENTION

Figure 1:
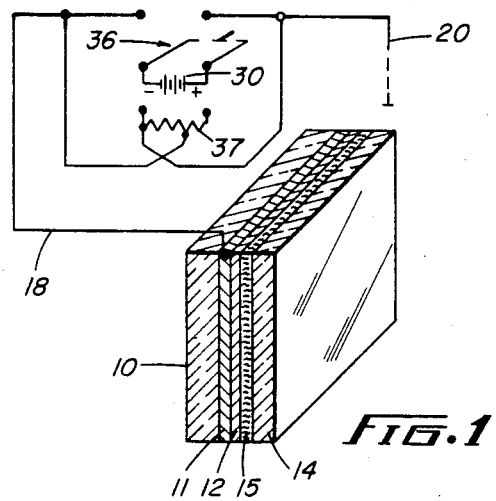

As used herein, a "persistent electrochromic material" is defined as a material responsive to the application of an electric field of a given polarity to change from a first persistent state in which it is essentially non-absorptive of electromagnetic radiation in a given wavelength region, to a second persistent state in which it is absorptive of electromagnetic radiation in the given wavelength region, and once in said second state, is responsive to the application of an electric field of the opposite polarity to return to its first state. Certain of such materials can also be responsive to a short circuiting condition, in the absence of an electric field, so as to return to the initial state.

By "persistent" is meant the ability of the material to remain in the absorptive state to which it is changed, after removal of the electric field, as distinguished from a substantially instantaneous reversion to the initial state, as in the case of the Franz-Keldysh effect.

ELECTROCHROMIC MATERIALS

The materials which form the electrochromic materials of the device in general are electrical insulators or semi-conductors. Thus are excluded those metals, metal alloys, and other metal-containing compounds which are relatively good electric conductors.

The persistent electrochromic materials are further characterized as inorganic substances which are solid under the conditions of use, whether as pure elements, alloys, or chemical compounds, containing at least one element of variable oxidation state, that is, at least one element of the Periodic System which can exist in more than one oxidation state in addition to zero. The term "oxidation state" as employed herein is defined in "Inorganic Chemistry," T. Moeller, John Wiley & Sons, Inc., New York, 1952.

These include materials containing a transition metal element (including Lanthanide and Actinide series elements), and materials containing non-alkali metal elements such as copper. Preferred materials of this class are films of transition metal compounds in which the transition metal may exist in any oxidation state from +2 to +8. Examples of these are: transition metal oxides, transition metal oxysulfides, transition metal halides, selenides, tellurides, chromates, molybdates, tungstates, vanadates, niobates, tantalates, titanates, stannates, and the like. Particularly preferred are films of metal stannates, oxides and sulfides of the metals of Groups (IV)B, (V)B and (VI)B of the Periodic System, and Lanthanide series metal oxides and sulfides. Examples of such are copper stannate, tungsten oxide, cerium oxide, cobalt tungstate, metal molybdates, metal titanates, metal niobates, and the like.

Additional examples of such compounds are the following oxides: MO oxides, e.g. $MnO$, $NiO$, $CoO$, etc.; $M_2O_3$ oxides, e.g., $Cr_2O_3$, $Fe_2O_3$, $Y_2O_3$, $Yb_2O_3$, $V_2O_3$, $Ti_2O_3$, $Mn_2O_3$, etc.; $MO_2$ oxides, e.g., $TiO_2$, $MnO_2$, $ThO_2$, etc.; $M_3O_4$ oxides, e.g., $Co_3O_4$, $Mn_3O_4$, $Fe_3O_4$, etc.; $MO_3$ oxides, e.g., $CrO_3$, $UO_3$, etc.; $M_2O_5$ oxides, e.g., $V_2O_5$, $Nb_2O_5$, $Ta_2O_5$ etc.; $M_4O_6$ oxides; $M_2O_7$ oxides, e.g., $V_2O_5$, $Nb_2O_2O_5$, $Ta_oO_5$, etc.; $M_4O_6$ oxides $M_2O_7$ oxides such as $M_2O_7$; complex oxides such as those of the formula $XYO_2$ (X and Y being different metals), e.g., $LiNiO_2$, etc.; $XYO_3$ oxides, e.g., $LiMnO_3$, $FeTiO_3$, $MnTiO_3$, $CoTiO_3$, $NiTiO_3$, $LiNbO_3$, $LiTaO_3$, $NaWO_3$, etc.; $XYO_4$ oxides, e.g., $MgWO_4$, $CdWO_4$, $NiWO_4$, etc.; $XY_2O_6$, e.g., $CaNb_2O_6$("Niobite" oxides); $X_2Y_2O_6$, e.g., $Na_2Nb_2O_6$: Spinel structure oxides, i.e., of the formula $X_2YO_4$; e.g., $Na_2MoO_4$, $NaWO_4$, $Ag_2MoO_4$, $Cu_2MoO_4$, $Li_2MoO_4$, $Li_2WO_4$, $Sr_2TiO_4$, $Ca_2MnO_4$, etc.; $XY_2O_4$, e.g., $FeCr_2O_4$, $TiZn_2O_4$, etc.; $X_2YO_5$ oxides, e.g., $Fe_2TiO_5$, $Al_2TiO_5$, etc.; and $X_3Y_3O$ (ternary) oxides, e.g., $Mo_3Fe_3O$, $W_3Fe_3O$, $X_3Ti_3O$ (where X is Mn, Fe, Co, etc.) For a discussion of some complex oxides, see Advanced Inorganic Chemistry, Cotten & Wilkinson, p. 51, (1966), Interscience Publishers, Inc., New York and Progress in Inorganic Chem., Vol. 1, 465 (1959) Interscience Publishers, Inc., New York. Also included are nitrides, and the sulfides corresponding to the above oxides. Hydrates of certain metal oxides may also be used, e.g., $WO_3 \cdot H_2O$, $WO_3 \cdot 2H_2O$, $MoO_3 \cdot H_2O$ and $MoO_3 \cdot 2H_2O$.

A particularly advantageous aspect in the present invention is the use of two separate layers of identical electrochromic materials one layer being employed in the counter-electrode for the other layer. A preferred embodiment consists of tungsten oxide as the electrochromic color electrode and tungsten oxide and graphite as the counter-electrode.

While the general mechanism of persistent electrochromism is unknown, the coloration is observed to occur at the negatively charged electrochromic layer. Generally, the phenomenon of persistent electrochromism is believed to involve cation transport such as hydrogen or lithium ions to the negative electrode where color centers form in the electrochromic image layer as a result of charge compensating electron flow.

When the persistent electrochromic materials are employed as films, thickness desirably will be in the range of from about 0.1–100 microns. However, since a small potential will provide an enormous field strength across very thin films, the latter, i.e., 0.1–10 microns, are preferred over thicker ones. Optimum thickness will also be determined by the nature of the particular compound being laid down as a film and by the film-forming method since the particular compound and film-forming method may place physical (e.g., non-uniform film surface) and economic limitations on manufacture of the devices.

The films may be laid down on any substrate which, relative to the film, is electrically conducting. The electrically conductive material may be coated on another suitable substrate material including glass, wood, paper, plastics, plaster, and the like, including transparent, translucent, opaque or other optical quality materials. A preferred embodiment in the instant device would employ at least one transparent electrode.

When tungsten oxide is employed as the electrochromic imaging material and an electric field is applied between the electrodes, a blue coloration of the previously transparent electrochromic layer occurs, i.e., the persistent electrochromic layer becomes absorptive of electromagnetic radiation over a band initially encompassing the red end of the visible spectrum, thereby rendering the imaging layer blue in appearance. Prior to the application of the electric field, the electrochromic imaging layer was essentially non-absorbent and thus transparent.

SPACING LAYER

A semi-solid ion conductive gel may be employed. One embodiment comprises in combination sulfuric acid and a gelling material for the acid. Any gelling agent which is compatible with the other components is suitable. Particularly advantageous gelling agents are polyvinyl alcohol, polyacrylamide, sodium silicate, cabo-sil, and the like.

A preferred embodiment employs $H_2SO_4$ in combination with polyvinyl alcohol. The properties of this gel may be varied in advantageous manner by employing polyvinyl alcohol of various molecular weights, differing sulfuric acid concentration and different polyvinyl alcohol to acid ratios. Thereby, gels can be produced to give a specific conductivity in the range of from about 0.10 to 0.60 $ohm^{-1} cm^{-1}$.

A distinct advantage of the above mentioned gels is their high ionic conductivity and good chemical stability. We have found that both requirements are unexpectedly met by gels in the preferred conductivity range of 0.20 – 0.40 $ohm^{-1} cm^{-1}$.

Other materials may be incorporated into the gel to vary the physical properties of the gel such as viscosity and vapor pressure. Thus, the composition may optionally include organic solvents such as dimethyl formamide, acetonitrile, proprionitrile, butyrolacetone and glycerin.

Further, the gels used in the instant invention may be made opaque with, for example, stable, white or colored pigments such as $TiO_2$ or $TiO_2$ doped with Ni, Sb for use in certain electrochromic display device applications. A fluid layer containing an acid may also be used in place of the gel, as disclosed in copending, commonly assigned application, Ser. No. 41,154, filed May 25, 1970.

The spacing layer may also be made ionically conductive by a semi-solid material such as a paste, grease or gel containing some ionically conducting materials. The dispersing medium may be one selected from a group consisting of an ionically conductive paste, grease or gel. A preferred embodiment in the present invention comprises the use of a conductive lithium stearate grease containing dispersed therein propylene carbonate and p-toluene sulfonic acid. The semi-solid medium can contain one or more salts selected from Group IA and IIA alkali or alkaline earth materials. Smaller ions such as lithium and sodium are preferred to larger ions as potassium and rubidium since ionic mobility in the electrochromic layer may be a limiting factor. The significant improvements in electrode reversibility and reproducibility and the important advantage of long term stability of operation by use of these gels were unexpected. This is a significant advantage in applications requiring long term service stability. Thus, alpha numeric character presentation and data display devices, wherein the service requirement is stated in years and/or millions of cycles, have become commercially feasible.

Additive Compounds

The compounds added to the electrolyte spacing layer are those used in the imaging layer. Preferably, the additive compound is the same as that of the imaging layer. $WO_3$ for example, is an effective additive when using a $WO_3$ imaging layer. The additives are used in an amount to form a 50 to 100 percent saturated solution.

Counter Electrode

As previously indicated, the counter-electrode may be any electrically conductive material. Particularly advantageous is a layer of electrochromic material, as described previously. It is also advantageous to use the same electrochromic material for the imaging area and counter-electrode. A mixture of graphite and an electrochromic material, or graphite alone may be used as the counter-electrode. Other metallic counter electrodes are disclosed in copending application, Ser. No. 41,154.

The invention may be better understood by reference to the drawings which show embodiments of the invention.

Figure 2:
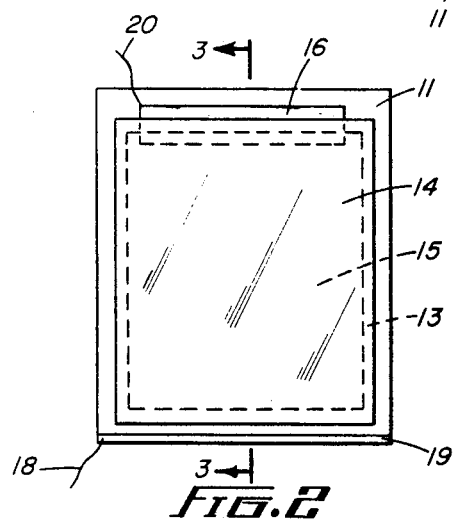
Figure 3:
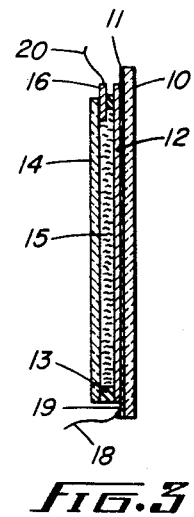
Figure 4:
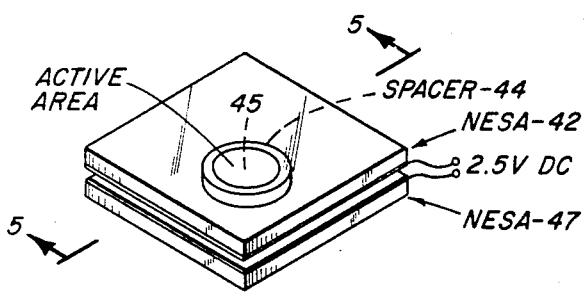
Figure 5:
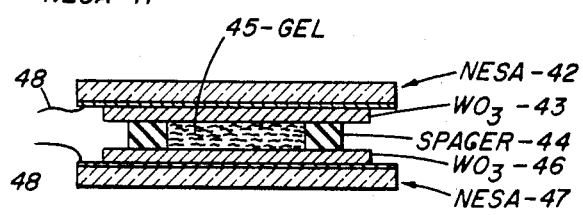

FIG. 1 is a cross-section view in part of an electrochromic device of the invention, showing the connecting electrical power circuit, FIG. 2 is a plan view of the device of FIG. 1, FIG. 3 is a cross-sectional view of taken along the lines 3—3 of FIG. 2, showing the complete device of FIG. 1, FIG. 4 is a view of an alternative embodiment of the inventive electrochromic device having a planar counter-electrode, FIG. 5 is a cross-sectional view taken along the lines 5—5 of FIG. 4.

With reference to FIG. 1, 10 is a substrate or backing material overlaid with a first electrode 11. The substrate 10 and the conductive layer 11 may conveniently be provided as a unit by so-called "NESA" glass, a commercially available product having a transparent coating of conductive tin oxide layer 11, deposited on glass. On the NESA glass, is deposited a layer of a persistent electrochromic material 12 for example by vacuum evaporating tungsten oxide to form a film 12 of thickness in the range of about 1 micron. Overlaying and in contact with film 12 is a gasket 13 formed from an electrically insulating material. As shown in FIGS. 2 and 3 the gasket 13 separates the film 12 from a glass cover plate 14 and produces a space for the gel electrolyte 15. In the end of the electrolyte chamber is a tungsten oxide counter electrode 16.

Contact to an external potential is secured by lead 18 from a conductive strip 19 over the tin oxide layer 11 of the conducting glass, and lead 20 to counter electrode 16. A source of dc potential 30 is coupled between the conductive films with its positive terminal connected to the metallic strip 19 and its negative terminal connected to the tungsten oxide counter electrode 16.

Turning now to drawing, FIG. 4 a plan view of another arrangement of the device of the present invention showing an electrochromically active center area and the external electrical leads is illustrated.

The components of the sandwich device are shown in cross section in FIG. 5. The outermost layers 42 and 47 consist of two pieces of transparent substrate containing on their inner surface an electrically conductive coating. The substrate and conductive layer may conveniently be provided as a unit by so-called "NESA" glass, a commercially available product having a transparent coating of conductive tin oxide on one surface of the glass as described previously. Deposed thereon and in contact with each conductive tin oxide layer are separate evaporated films of tungsten oxide 43 and 46 each about 1 micron in thickness. Between and in contact with both tungsten oxide films there is disposed a center potion of an opacified gel 45 about 3 mm in thickness enclosed by a circular insulating spacer 44. Electricad contact of the device to the external potential is accomplished by soldered electrical wire connections 48 and 49 from the NESA conductive layers. The electrical pathway through the cell is from one tungsten oxide layer, through the conductive electrolyte gel to the other tungsten oxide layer. Because of the arrangement of the two electrochromic films in opposed relationship the arrangement shown in FIGS. 3 and 4 permits the display of only one electrochromic layer at a time.

The following specific examples are given to illustrate the invention further and to show specific embodiments and modes of practice of the invention and are not intended to be limitative.

EXAMPLE 1

Graphite on Substrate Counter-Electrode

A counter-electrode was prepared as follows: Dixon Crucible Co. Graphokote No. 120 was brushed on a clean substrate of NESA glass. Air drying for one-half hour and baking at 300°C. for one-half hour followed. The electrode was cooled to 25°C and soaked in a solution of glycerin-sulfuric acid 10:1 by volume for 24 hours minimum, rinsed with acetone and baked at 90°C. for one-half hour to dry. The resulting unit weight of graphite was 2 mg./cm².

EXAMPLE 2

Graphite "salted" with $WO_3$ Powder

The graphite film was applied to the clean substrate as in Example 1 electrodes except that while the Graphokote 120 film was still wet, $WO_3$ powder was sprinkled onto the surface. The $WO_3$ particles became embedded in the graphite film as the electrode was air dried at 25°C. This step was followed by the 300°C. oven bake acid treatment, rinse and dry mentioned in the type 1 electrode preparation. The resulting deposit was composed of approximately 0.5 gm./cm²$WO_3$ on 2.0 mg./cm² Graphokote120.

EXAMPLE 3

An electrochromic device was constructed from two

NESA glass plates. One conductive NESA plate was coated with a 0.5 micron thick evaporated film of tungsten oxide. The other NESA plate was counter-electrode as in Example 2. The glass plates so formed were pressed together with the electrochromic and graphite films facing each other but separated by a 0.6 mm. thick sealing ring and spacer which retained an ionically conductive paste consisting of a $TiO_2$ pigment in a 1:10 ratio of concentrated sulfuric acid and glycerin. This paste was saturated with $WO_3$. This was accomplished by adding a surplus of $WO_3$. This was accomplished by adding a surplus of $WO_3$ to the glycerin and sulfuric acid mixture and storing for several days at 50°C. The saturated solution was then poured off leaving the solids behind. The solution was then mixed with the $TiO_2$ pigment. This device was cycled from color to clear and back to color at an applied potential of 1.1 volts D.C. with half cycles of 100 milliseconds. The device underwent 8,000,000 cycles of switching at 60 cycles per minute without observable deterioration.

EXAMPLE 4

This electrochromic device was constructed from a NESA glass plate and a stainless steel plate. The conductive NESA plate was coated with a 1.0 micron thick evaporated film of tungsten oxide. A type 316 stainless steel plate was used as the conductive substrate in the preparation of a counter-electrode as in Example 2. The electrodes so formed were pressed together with the electrochromic and graphite films facing each other but separated by a 0.6 mm. thick sealing ring and spacer which retained an ionically conductive paste consisting of a $TiO_2$ pigment in a 1:10 ratio of concentrated sulfuric acid and glycerin, saturated with $WO_3$ as in Example 3. This device was cycled from color to clear at a potential of 1.25 volts D.C. and from clear to color at 1.05 volts D.C. with half cycles of 100 milliseconds. The device underwent 7,500,000 cycles of switching at 60 cycles per minute without observable deterioration.

I claim:

1. A variable light transmission device which comprises a layer of a persistent electrochromic material as a light modulating material, a counter-electrode, and an electrolyte material in contact with said layer of material and counter-electrode, said electrolyte containing as an additive of the type of said persistent electrochromic material.

2. A variable light transmission device as in claim 1, which comprises a plurality of layers in the following order, a conductive electrode, a layer of said electrochromic material, an electrolyte layer, and a counter-electrode.

3. The device of claim 2, wherein said counter-electrode is a layer of a material of the type of the persistent electrochromic material on a conductive surface.

4. The device of claim 3, wherein the electrochromic materials in each said layer are identical.

5. The device of claim 2, wherein at least one of the electrodes is substantially transparent.

6. The device of claim 4 wherein said electrochromic materials are $WO_3$ and said additive material is $WO_3$.

7. A device as in claim 1 wherein said electrolyte contains a gelling agent.

8. A device as in claim 1 comprising means for subjecting the device to an electric field of alternating polarity whereby coloration and erase cycles are obtained without change in voltage-time characteristics.

* * * * *